US012134666B2

United States Patent
Xu et al.

(10) Patent No.: US 12,134,666 B2
(45) Date of Patent: Nov. 5, 2024

(54) AQUEOUS DISPERSION AND AQUEOUS COATING COMPOSITION

(71) Applicants: Dow Global Technologies LLC, Midland, MI (US); Rohm and Haas Company, Collegeville, PA (US)

(72) Inventors: Jianming Xu, Shanghai (CN); Wei Cui, Shanghai (CN); Yunfei Lan, Shanghai (CN); Qingwei Zhang, Shanghai (CN); Han Lv, Shanghai (CN)

(73) Assignees: Dow Global Technologies LLC, Midland, MI (US); Rohm and Haas Company, Midland, MI (US)

( * ) Notice: Subject to any disclaimer, the term of this patent is extended or adjusted under 35 U.S.C. 154(b) by 302 days.

(21) Appl. No.: 17/271,382

(22) PCT Filed: Oct. 24, 2018

(86) PCT No.: PCT/CN2018/111588
§ 371 (c)(1),
(2) Date: Feb. 25, 2021

(87) PCT Pub. No.: WO2020/082257
PCT Pub. Date: Apr. 30, 2020

(65) Prior Publication Data
US 2021/0324114 A1 Oct. 21, 2021

(51) Int. Cl.
| | |
|---|---|
| *C08F 220/18* | (2006.01) |
| *C08F 2/22* | (2006.01) |
| *C08F 220/06* | (2006.01) |
| *C08F 220/28* | (2006.01) |
| *C08K 5/5425* | (2006.01) |
| *C08K 5/5435* | (2006.01) |
| *C09D 133/08* | (2006.01) |

(52) U.S. Cl.
CPC .............. *C08F 2/22* (2013.01); *C08F 220/06* (2013.01); *C08F 220/1802* (2020.02); *C08F 220/1812* (2020.02); *C08F 220/283* (2020.02); *C08K 5/5425* (2013.01); *C08K 5/5435* (2013.01); *C09D 133/08* (2013.01); *C08L 2201/54* (2013.01)

(58) Field of Classification Search
CPC ........................ C08F 220/06; C08F 220/1802; C08F 220/14; C08F 220/1812; C08F 220/283; C08F 212/30; C08F 230/085; C08F 230/00
See application file for complete search history.

(56) References Cited

U.S. PATENT DOCUMENTS

| | | | |
|---|---|---|---|
| 2007/0191522 A1* | 8/2007 | Obst | C09D 133/04 |
| | | | 524/261 |
| 2007/0282046 A1 | 12/2007 | Killilea et al. | |
| 2011/0282000 A1 | 11/2011 | Hayes | |
| 2014/0213692 A1* | 7/2014 | Zhang | A61K 8/44 |
| | | | 523/122 |
| 2015/0183708 A1 | 7/2015 | Harris et al. | |
| 2015/0232687 A1 | 8/2015 | Tian et al. | |
| 2016/0115341 A1 | 4/2016 | Xu et al. | |
| 2017/0335116 A1 | 11/2017 | Qian et al. | |
| 2018/0171051 A1* | 6/2018 | Junk | C09D 5/02 |

FOREIGN PATENT DOCUMENTS

| | | |
|---|---|---|
| CN | 102516436 | 6/2012 |
| CN | 104725963 A | 6/2015 |
| EP | 1595926 A1 | 11/2005 |
| EP | 2514790 A1 | 10/2012 |
| WO | 2018086055 A1 | 5/2018 |

OTHER PUBLICATIONS

Byrne et al; Epoxysilane Oligomer for protective coatings; Momentive Performance Materials; pp. 32-40 (Year: 2010).*
Chinese Office Action for the corresponidng Chinese Application No. 201880097867.X; Date of Dispatch: Dec. 20, 2021; 2 pages.
Chinese Search Report for the corresponidng Chinese Application No. 201880097867 X; Date of Examination: Dec. 13, 2021; 2 pages.
Supplementary European Search Report for the corresponding European Application No. 18937848; Date of completion of the search: Apr. 4, 2022; 8 pages.

* cited by examiner

*Primary Examiner* — Karuna P Reddy

(57) ABSTRACT

The present invention provides an aqueous dispersion as a biobased binder and an aqueous coating composition comprising such aqueous dispersion and showing balanced stain resistance, freeze-thaw stability, and anti-clogging properties.

7 Claims, No Drawings

AQUEOUS DISPERSION AND AQUEOUS COATING COMPOSITION

FIELD OF THE INVENTION

The present invention relates to an aqueous dispersion suitable for use as a biobased binder and an aqueous coating composition comprising the same with good balance of paint properties.

INTRODUCTION

Aqueous or waterborne coating compositions are becoming increasingly more important than solvent-based coating compositions for less environmental problems. It is further desirable to use renewable materials to replace fossil materials, therefore to reduce emission of greenhouse gas and contribute to sustainability. For example, the United States Department of Agriculture (USDA) BioPreferred program requires minimum biobased content of 22% for biobased binders in the category of Intermediates-Paint and Coating Components, as determined by ASTM D-6866-16. However, it is a challenge for aqueous coating compositions comprising these biobased binders to achieve comparable coating performance such as freeze-thaw (F/T) stability, stain resistance and anti-clogging properties as conventional aqueous coatings. For example, some high-end applications require coatings having a total stain removal score of at least 60 according to the standard method GB/T 9780-2013 in China. Chinese Patent Publication No. 102516436 discloses a self-crosslinking styrene acrylic binder prepared by polymerization of 15% stearyl methacrylate/32% butyl acrylate/2.5% acrylic acid/3.5% ethylene glycol acetylacetate methacrylate/32% styrene/15% methyl methacrylate, by weight based on the total weight of monomers. However, large amounts of coagulum were formed during the polymerization and aqueous coating compositions comprising such binder showed poor F/T stability.

Therefore, there remains a need to develop an aqueous dispersion suitable for use as a biobased binder in coating compositions, which still provide the above balanced properties.

SUMMARY OF THE INVENTION

The present invention provides a novel aqueous dispersion useful as a biobased binder for preparing aqueous coating compositions. The aqueous dispersion can provide aqueous coating compositions comprising thereof with improved balance in stain resistance, freeze-thaw stability and anti-clogging properties.

In a first aspect, the present invention is an aqueous dispersion comprising:

(i) an emulsion polymer comprising, by weight based on the weight of the emulsion polymer, from 30% to 80% of structural units of a soft alkyl (meth)acrylate with a biobased content more than 30% to 60%;

more than 5% to 30% of structural units of a $C_8$-$C_{16}$-alkyl (meth)acrylate with a biobased content greater than 60%;

from 0.1% to 10% of structural units of an acetoacetoxy or acetoacetamide functional monomer, from 0.1% to 10% of structural units of an ethylenically unsaturated monomer carrying at least one functional group selected from carboxyl, carboxylic anhydride, sulfonic acid, amide, sulphonate, phosphonate, phosphate, hydroxyl, ureido, or combinations thereof;

from zero to 50% structural units of a hard acrylic monomer; and from zero to 3% of structural units of a (meth)acryl functional silane; and (ii) from zero to 3% of an epoxy functional silane, by weight based on the weight of emulsion polymer;

wherein the epoxy functional silane and the structural units of the (meth)acryl functional silane is present in a combined amount of from 0.05% to 3%, by weight based on the weight of the emulsion polymer.

In a second aspect, the present invention is an aqueous coating composition comprising the aqueous dispersion of the first aspect.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(\text{calc.})} = \frac{w(T_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

As used herein, the term structural units, also known as polymerized units, of the named monomer refers to the remnant of the monomer after polymerization, or the monomer in polymerized form. For example, a structural unit of methyl methacrylate is as illustrated:

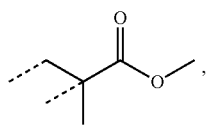

where the dotted lines represent the points of attachment of the structural unit to the polymer backbone.

The aqueous dispersion of the present invention comprises one or more emulsion polymers. The emulsion polymer may comprise structural units of one or more soft alkyl (meth)acrylates. As used herein, the term "soft alkyl (meth)acrylate" refers to an alkyl (meth)acrylate whose homopolymer has a Tg<70° C., preferably, −40° C. or more, −30° C. or more, or even −20° C. or more. These soft alkyl (meth)acrylates may have a biobased content of greater than 30% (>30%) to 60%, which are typically formed from reacting (meth)acrylic acid with bioalchols, such as bioethanol. The biobased content in the present invention may be determined by calculation according to the method described in the Examples section below, or measured according to ASTM D-6866-16 Standard Test Methods for Determining the Biobased Content of Solid, Liquid, and Gaseous Samples Using Radiocarbon Analysis test method. Suitable soft alkyl (meth)acrylates may include, for example, ethyl acrylate, ethyl methacrylate, or mixtures thereof. The emulsion polymer may comprise, by weight based on the weight of the emulsion polymer, 30% or more, 35% or more, 40% or more, 45% or more, or even 50% or more, and at the same time, 75% or less, 70% or less, 65% or less, 60% or less, or even 55% or less, of structural units of the soft alkyl (meth)acrylate. "Weight of the emulsion polymer" in the present invention refers to the dry or solid weight of the emulsion polymer.

The emulsion polymer useful in the present invention may comprise structural units of one or more $C_8$-$C_{16}$-alkyl (meth)acrylates with a biobased content greater than 60% (>60%). The $C_8$-$C_{16}$-alkyl (meth)acrylate refer to alkyl (meth)acrylates containing alkyl with from 8 to 16 carbon atoms, preferably from 10 to 16 carbon atoms, and more preferably from 12 to 16 carbon atoms. Suitable $C_8$-$C_{16}$-alkyl (meth)acrylates may include, for example, decyl acrylate, decyl methacrylate, isodecyl methacrylate, isodecyl acrylate, lauryl acrylate, lauryl methacrylate, or mixtures thereof. Preferably, the $C_8$-$C_{16}$-alkyl (meth)acrylate is a mixture of alkyl (meth)acrylates with alkyl groups having different carbon atoms. The emulsion polymer may comprise, by weight based on the weight of the emulsion polymer, more than 5% of structural units of the $C_8$-$C_{16}$-alkyl (meth)acrylate, for example, 5.5% or more, 6% or more, 6.5% or more, 7% or more, 7.5% or more, 8% or more, 8.5% or more, 9% or more, 9.5% or more, or even 10% or more, and at the same time, 30% or less, 27% or less, 28% or less, 26% or less, 25% or less, 24% or less, 23% or less, 22% or less, 21% or less, 20% or less, 18% or less, 16% or less, or even 15% or less, of structural units of the $C_8$-$C_{16}$-alkyl (meth)acrylate.

The emulsion polymer useful in the present invention may also comprise structural units of one or more acetoacetoxy or acetoacetamide functional monomers useful as crosslinking monomers. The acetoacetoxy or acetoacetamide functional monomers can be ethylenically unsaturated acetoacetoxy or acetoacetamide functional monomers. The acetoacetoxy or acetoacetamide functional monomers are monomers having one or more acetoacetyl functional groups represented by:

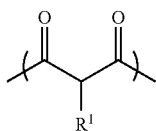

wherein $R^1$ is hydrogen, an alkyl having 1 to 10 carbon atoms, or phenyl.

Examples of suitable acetoacetoxy or acetoacetamide functional groups include

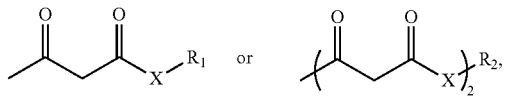

wherein X is O or N, $R_1$ is a divalent radical and $R_2$ is a trivalent radical, that attach the acetoacetoxy or acetoacetamide functional group to the backbone of the polymer.

Examples of suitable acetoacetoxy or acetoacetamide functional monomers include acetoacetoxyalkyl (meth)acrylates such as acetoacetoxyethyl methacrylate (AAEM), acetoacetoxyethyl acrylate, acetoacetoxypropyl methacrylate, acetoacetoxybutyl methacrylate, and 2,3-di(acetoacetoxy)propyl methacrylate; allyl acetoacetate; vinyl acetoacetate; acetoacetamidoalkyl (meth)acrylates such as acetoacetamidoethyl methacrylate, acetoacetamidoethyl acrylate; or combinations thereof. Preferred acetoacetoxy or acetoacetamide functional monomer is acetoacetoxyethyl methacrylate. The emulsion polymer may comprise, by weight based on the weight of the emulsion polymer, 0.1% or more, 0.2% or more, 0.5% or more, 0.8% or more, 1% or more, 1.2% or more, 1.5% or more, 1.8% or more, 2% or more, 2.2% or more, or even 2.5% or more, and at the same time, 10% or less, 8% or less, 6% or less, 5% or less, 4% or less, 3.5% or more, or even 3% or less, of structural units of the acetoacetoxy or acetoacetamide functional monomer.

The emulsion polymer useful in the present invention may also comprise structural units of one or more ethylenically unsaturated monomers carrying at least one functional group selected from carboxyl, carboxylic anhydride, sulfonic acid, amide, sulphonate, phosphonate, phosphate, hydroxyl, ureido, or combinations thereof (hereinafter "functional-group-containing monomers"). Suitable functional-group-containing monomers may include, for example, α, β-ethylenically unsaturated carboxylic acids including an acid-bearing monomer such as methacrylic acid (MAA), acrylic acid (AA), itaconic acid (IA), maleic acid, or fumaric acid; or a monomer bearing an acid-forming group which yields or is subsequently convertible to, such an acid group (e.g., anhydride, (meth)acrylic anhydride, or maleic anhydride); sodium styrene sulfonate (SSS), sodium vinyl sulfonate (SVS), 2-acrylamido-2-methylpropanesulfonic acid (AMPS), ammonium salt of 2-acrylamido-2-methyl-1-propane sulfonic acid, sodium salt of allyl ether sulfonate; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; hydroxy-functional alkyl esters of (meth)acrylic acids including such as hydroxyethyl methacrylate and hydroxypropyl methacrylate; ureido methacrylate, N-(2-Methacrylamidoethyl)ethylene urea, and N-(2-Methacryloyloxyethyl) ethylene urea; ethylenically unsaturated phosphorous acid monomers and/or salts thereof including, for example, phosphoalkyl (meth)acrylates such as phosphoethyl (meth)acrylate such as phosphoethyl methacrylate (PEM), phosphopropyl (meth)acrylate, phosphobutyl (meth)acrylate, salts thereof, and mixtures thereof; $CH_2{=}C(R)-C(O)-O-(R_pO)_n-P(O)(OH)_2$, wherein R=H or $CH_3$, $R_p$=alkyl, such as an ethylene group, a propylene group, or a combination thereof; and n=1-20, such as SIPOMER PAM-100, SIPOMER PAM-200, SIPOMER PAM-300 and SIPOMER PAM-600 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof; or mixtures thereof. Preferred functional-group-containing monomers include methacrylic acid, acrylic acid, sodium styrene sulfonate, or mixtures thereof. The emulsion polymer may comprise, by weight based on the weight of the emulsion polymer, 0.1% or more, 0.5% or more, 0.8% or more, 1% or more, or even 1.5% or more, and at the same time, 10% or less, 8% or less, 5% or less, 4% or less, 3% or less, 2.5% or less, or even 2% or less, of structural units of the functional-group-containing monomer.

The emulsion polymer useful in the present invention may also comprise structural units of one or more hard acrylic monomers. As used herein, the term "hard acrylic monomers" refers to an acrylic monomer whose homopolymer has a Tg equal to or greater than 70° C. Suitable hard acrylic monomers may include, for example, methyl methacrylate, cycloalkyl methacrylates such as cyclohexyl methacrylate, or mixtures thereof. Preferred hard acrylic monomers include methyl methacrylate. The emulsion polymer may comprise, by weight based on the weight of the emulsion polymer, zero or more, 5% or more, 10% or more, 15% or more, 20% or more, 22% or more, 25% or more, 27% or more, or even 30% or more, and at the same time, 50% or less, 45% or less, 40% or less, 37% or less, 36% or less, 35% or less, 34% or less, 33% or less, or even 32% or less, of structural units of the hard acrylic monomer.

The emulsion polymer useful in the present invention may also comprise structural units of one or more (meth)acryl functional silanes. The (meth)acryl functional silanes are typically trialkoxyfunctional silanes containing one acryl or methacryl group. The (meth)acryl functional silanes can be (meth)acryloxyalkyltrialkoxysilanes. Examples of suitable (meth)acryl functional silanes include (meth)acryloxyethyltrimethoxysilane, (meth)acryloxypropyltrimethoxysilane, (meth)acryloxyethyltriethyoxysilane, (meth)acryloxypropyltriethoxysilane, (meth)acryloxypropyltripropoxysilane, or mixtures thereof. Preferred (meth)acryl functional silanes include 3-methacryloxypropylmethyldimethoxysilane, 3-methacryloxypropyltrimethoxysilane, 3-methacryloxypropyltriethoxysilane, or mixtures thereof.

The emulsion polymer useful in the present invention may also comprise structural units of one or more additional ethylenically unsaturated nonionic monomers that are different from the monomers described above, and typically have a biobased content in the range of from zero to 5%. "Nonionic monomers" herein refers to monomers that do not bear an ionic charge between pH=1-14. Suitable additional ethylenically unsaturated nonionic monomers may include, for example, styrene, substituted styrene such as alpha-methylstyrene, 2,4-dimethylstyrene, ethylstyrene, and butylstryene; and o-, m-, and p-methoxystyrene; butyl acrylate; butyl methacrylate; 2-ethylhexyl acrylate; or mixtures thereof. The emulsion polymer may comprise, by weight based on the weight of the emulsion polymer, from zero to 15% of structural units of the additional ethylenically unsaturated nonionic monomer, for example, 10% or less, 5% or less, or even 1% or less. The emulsion polymer useful in the present invention can be a pure acrylic polymer, or comprise a small amount of styrene and/or substituted styrene. Preferably, the emulsion polymer is substantially free of structural units of styrene and/or substituted styrene, e.g., less than 1%, less than 0.5%, or even less than 0.1%.

The emulsion polymer useful in the present invention may optionally comprise structural units of one or more multi-ethylenically unsaturated monomers including di-, tri-, tetra-, or higher multifunctional ethylenically unsaturated monomers, that are different from the monomers described above. Suitable multiethylenically unsaturated monomers may include, for example, butadiene, allyl (meth)acrylate, divinyl benzene, ethylene glycol dimethacrylate, butylene glycol dimethacrylate, and mixtures thereof. The emulsion polymer may comprise, by weight based on the weight of the emulsion polymer, from zero to 1%, from 0.05% to 0.8%, or from 0.1% to 0.5%, of structural units of the multiethylenically unsaturated monomer.

The types and levels of the monomers described above for preparing the emulsion polymer may be chosen to provide the emulsion polymer with a glass transition temperature (Tg) of −20° C. or more, −10° C. or more, 0° C. or more, 5° C. or more, 8° C. or more, or even 10° C. or more, and at the same time, 30° C. or less, 28° C. or less, 25° C. or less, 22° C. or less, or even 20° C. or less, or even 18° C. or less. Tgs of the emulsion polymers may be calculated herein by using the Fox equation described above.

The emulsion polymer useful in the present invention can be a biobased polymer suitable for use as a biobased binder in paints and coatings. "Biobased polymer" herein refers to a polymer with a biobased content equal to or greater than 22%, for example, 23% or more, 24% or more, 25% or more, 26% or more, 27% or more, 28% or more, 29% or more, or even 30% or more.

The aqueous dispersion of the present invention may further comprise one or more epoxy functional silanes. The epoxy functional silanes can be epoxy silane oligomers, epoxy silane compounds, or combinations thereof.

The epoxy silane oligomers useful in the present invention are typically saturated epoxy functional polysiloxane oligomers. "Oligomer" herein refers to a polymer having a number-average molecular weight of from 200 to 3,000, from 300 to 2,000, or from 350 to 1,000. The number-average molecular weight (Mn) of the epoxy oligomer can be measured by gel permeation chromatography (GPC) using an Agilent 1200. A sample is dissolved in tetrahydrofuran (THF) with a concentration of 5 mg/mL and then filtered through 0.45 μm polytetrafluoroethylene (PTFE) filter prior to the GPC analysis. Conditions for the GPC analysis are as follows, Column: One PLgel GUARD columns (10 μm, 50×7.5 mm), two Polymer Laboratories Mixed E columns (7.8×300 mm) in tandem; column temperature: 40° C.; mobile phase: THF; flow rate: 1.0 mL/minute; Injection volume: 50 L; detector: Agilent Refractive Index detector, 40° C.; and calibration curve: PL Polystyrene Narrow standards with molecular weights ranging from 580 to 19760 g/mol, using polynom 3 fitness. The peak molecular weight (Mp) used for narrow calibration is values converted from Mp of each PS standard using following equation: $M_p = 1.0951$ Mp of $PS^{0.9369}$.

The epoxy silane oligomers useful in the present invention may have the structure of formula (I):

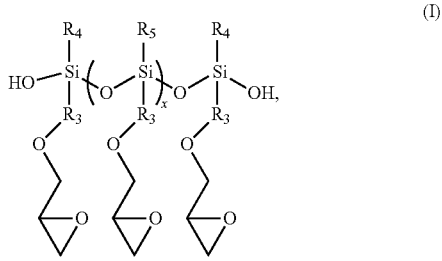

where x is from 0 to 14, preferably, from 0 to 4, from 1 to 4, or from 1 to 3; $R_3$ is —$CH_2CH_2CH_2$—; and $R_4$ and $R_5$ each independently represent —OH, —$OCH_3$, —$OCH_2CH_3$, or —$CH_3$. The epoxy silane oligomer can be a mixture of oligomers having the structure of formula (I) with different x values, for example, 0, 1, 2 or 3.

The epoxy silane compounds useful in the present invention that are different from the epoxy silane oligomers are typically saturated alkoxylated silane having an epoxy group. The epoxy silane compound may have at least one hydrolysable silane group. A preferred epoxy silane compound has the general formula (II):

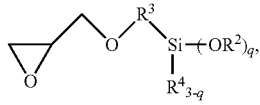

where $R^2$ represents an alkyl group having one to 6 carbon atoms, and $OR^2$ group represents an alkoxy group containing the alkyl group as defined in $R^2$, including, for example, methoxy, ethoxy, or combinations thereof; $R^3$ represents a bivalent organic group having a molecular weight of 200 or less, preferably, a $C_1$-$C_{10}$, $C_1$-$C_5$, or $C_1$-$C_3$ alkylene group; $R^4$ represents a hydrogen atom or an alkyl, aryl, or aralkyl group having one to 20 carbon atoms; and q is one, 2 or 3. Examples of suitable epoxy silane compounds include 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, or mixtures thereof.

The epoxy functional silanes and the structural units of the (meth)acryl functional silanes may be present, by weight based on the weight of the emulsion polymer, in a combined amount of 0.05% or more, 0.1% or more, 0.15% or more, 0.2% or more, 0.25% or more, 0.3% or more, 0.35% or more, or even 0.4% or more, and at the same time, 3% or less, 2.5% or less, 2% or less, 1.5% or less, 1.2% or less, 1% or less, 0.9% or less, 0.8% or less, 0.7% or less, 0.6% or less, or even 0.5% or less.

In some embodiments, the aqueous dispersion comprises, by weight based on the weight of the emulsion polymer, the emulsion polymer and from 0.05% to 1% of the epoxy functional silane, wherein the emulsion polymer comprises:
from 30% to 60% of structural units of the soft alkyl (meth)acrylate,
from 7% to 15% of structural units of the $C_8$-$C_{16}$ alkyl (meth)acrylate,
from 0.5% to 3% of structural units of the functional-group-containing monomer,
from 2% to 8% of structural units of the acetoacetoxy or acetoacetamide functional monomer,
from 20% to 40% of structural units of the hard acrylic monomer; and from zero to 1% of structural units of the (meth)acryl functional silane.

The aqueous dispersion of the present invention may be prepared by: first forming the emulsion polymer by emulsion polymerization of a mixture of monomers comprising the monomers described above, and optionally mixing the emulsion polymer with the epoxy functional silane. Total weight concentration of the mixture of monomers used for preparing the emulsion polymer is equal to 100%. The mixture of monomers may be added neat or as an emulsion in water; or added in one or more additions or continuously, linearly or nonlinearly, over the reaction period of preparing the emulsion polymer. Temperature suitable for polymerization process may be lower than 100° C., in the range of from 30° C. to 95° C., or in the range of from 50° C. to 90° C. One or more surfactants may be used in preparing the emulsion polymer. The surfactant may be added prior to, during, or after the polymerization of the monomer mixture, or combinations thereof. These surfactants may include anionic and/or nonionic emulsifiers, such as, for example, phosphate surfactants, sulfates surfactant, sulfonates surfactant and succinates surfactant. Some of commercially available surfactants include DISPONIL FES 32 fatty alcohol ether sulfate available from BASF; RHODAFAC RS-610 fatty alcohol ether phosphate, AEROSOL A-102 sulfosuccinate surfactant, and sodium dodecylbenzene sulfonate surfactant all from Solvay from Solvay; sodium lauryl sulfate from Stepan, TERGITOL™ 15-S-40 secondary alcohol ethoxylate available from Dow Chemical Company (TERGITOL is a trademark of The Dow Chemical Company). The surfactant used is usually from zero to 5%, from 0.5% to 3%, or from 0.8% to 2%, by weight based on the total weight of monomers used for preparing the emulsion polymer. The epoxy functional silane may be added after the polymerization of the monomer mixture.

In the polymerization process, free radical initiators and/or chain transfer agents may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer, for example, from zero to 1%, from 0.1% to 0.5%, or from 0.15% to 0.4%, by weight based on the total weight of monomers used for preparing the emulsion polymer.

After completing the polymerization, the obtained dispersion may be neutralized by one or more bases as neutralizers to a pH value, for example, at least 6, from 6 to 10, or from 7 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The resultant aqueous dispersion of the present invention comprises a low level of coagulum, for example, less than 1,000 ppm, less than 800 ppm, less than 500 ppm, less than 400 ppm, less than 300 ppm, or even less than 200 ppm.

The emulsion polymer particles in the aqueous dispersion of the present invention may have a particle size of from 50 nanometers (nm) to 500 nm, from 80 nm to 200 nm, or from 90 nm to 150 nm. The particle size herein refers to Z-average size and may be measured by a Brookhaven BI-90 Plus Particle Size Analyzer.

The aqueous dispersion of the present invention is particularly useful for zero or low VOCs coating applications where balanced properties including stain resistance, F/T stability and anti-clogging properties are desired. The aqueous dispersion may have lower than 1000 parts per million (ppm) volatile organic compounds (VOCs) according to the GB18582-2008 method. Preferably, the VOC content of the aqueous dispersion is less than 800 ppm, less than 600 ppm, less than 500 ppm, less than 400 ppm, less than 300 ppm, or even less than 200 ppm.

The aqueous coating composition of the present invention may also comprise one or more pigments and/or extenders. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide (TiO$_2$), zinc oxide, zinc sulfide, iron oxide, barium sulfate, barium carbonate, or mixtures thereof. Preferred pigment used in the present invention is TiO$_2$. TiO$_2$ may be also available in concentrated dispersion form. The term "extender" refers to a particulate inorganic material having a refractive index of less than or equal to 1.8 and greater than 1.3. Examples of suitable extenders include calcium carbonate, aluminium oxide (Al$_2$O$_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 30% to 70%, from 40% to 60%, or from 45% to 55%. PVC of a coating composition may be determined according to the following equation:

$$PVC = \frac{\text{volume of pigment(s)} + \text{volume of extender(s)}}{\text{total dry volume of coating composition}} * 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the aqueous coating composition, in an amount of generally from 0 to 0.5%, from 0.05% to 0.4%, or from 0.1% to 0.3%.

The aqueous coating composition of the present invention may further comprise one or more thickeners, also known as "rheology modifiers". The thickeners may include polyvinyl alcohol (PVA), acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is selected from HASE, HEC, HEUR, or mixtures thereof. The thickener may be present, by weight based on the total weight of the aqueous coating composition, in an amount of generally from 0 to 3.0%, from 0.1% to 1.5%, or from 0.2% to 1.2%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, TRITON™ CF-10 nonionic surfactant available from The Dow Chemical Company (TRITON is a trademark of The Dow Chemical Company), SURFYNOL 10 nonionic wetting agent based on an actacetylenic diol available from Air Products, BYK-346 and BYK-349 polyether-modified siloxanes both available from BYK, or mixtures thereof. The wetting agent may be present, by weight based on the total weight of the aqueous coating composition, in an amount of from 0 to 1.0%, from 0.1% to 0.8%, or from 0.2% to 0.6%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include TEXANOL ester alcohol available from Eastman Chemical Company, Coasol and Coasol 290 Plus coalescents available from Chemoxy International Ltd., dipropylene glycol n-butyl ether, ethylene glycol monobutyl ether, diethylene glycol monobutyl ether, n-butyl ether, or mixtures thereof. The coalescent may be present, by weight based on the total weight of the aqueous coating composition, in an amount of from zero to 3.0%, from 0.1% to 2.0%, or from 0.2% to 1.5%.

The aqueous coating composition of the present invention may further comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., molecular weight ranging from 1,000 to 50,000 as measured by GPC), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by weight based on the total weight of the aqueous coating composition, in an amount of from 0 to 1.0%, from 0.1% to 0.8%, or from 0.2% to 0.6%.

The aqueous coating composition of the present invention may comprise one or more anti-freeze agents without contributing VOCs. Specific examples of anti-freeze agents may include polyethylene glycol, RHODOLINE FT-100 freeze thaw stabilizer available from Solvay, or mixtures thereof. The anti-freeze agent, if present, should be in an amount without compromising stain resistance of coatings made therefrom, e.g., up to 0.5%, up to 0.4%, or up to 0.1%, of the anti-freeze agent, by weight based on the total weight of the aqueous coating composition. Preferably, the aqueous coating composition is substantially free of the anti-freeze agents (e.g., less than 0.1% or even less than 0.05%).

In addition to the components described above, the aqueous coating composition of the present invention may further comprise any one or combination of the following additives: buffers, neutralizers, humectants, mildewcides, biocides, anti-skinning agents, colorants, flowing agents, crosslinkers, anti-oxidants, plasticizers, leveling agents, thixotropic agents, adhesion promoters, and grind vehicles. These additives may be present in a combined amount of from 0 to 1% or from 0.1% to 0.8%, by weight based on the total weight of the aqueous coating composition.

The aqueous coating composition of the present invention may further comprise water typically present in an amount of from 30% to 90%, from 40% to 80%, or from 50% to 70%, by weight based on the total weight of the aqueous coating composition.

The aqueous coating composition of the present invention may have a biobased content of 20% or more, as determined by ASTM D-6866-16. The aqueous coating composition also has good freeze-thaw stability and good anti-clogging properties according to the test methods described in the Examples section. The aqueous coating composition can also provide coatings made therefrom with improved stain resistance as indicated by a total stain removal score of at least 60 according to GB/T 9780-2013. "Good freeze-thaw stability" (that is, being freeze-thaw stable) means that a composition can be subjected to three freeze-thaw cycles (from −6° C. to room temperature) showing no coagulation and/or grits separated, and change in Krebs units (KU) viscosity (i.e., delta KU) smaller than or equal to 10 KU, according to the test method described in the Examples section below. The GB 18582-2008 method herein is the national standard for indoor decorating and refurbishing materials-limit of harmful substances of interior architectural coatings, which was issued on Apr. 1, 2008 and put into effect on Oct. 1, 2008. The GB/T 9780-2013 method herein is the national standard for test method for dirt pickup resistance and stain removal of films of architectural coatings and paints, which was issued on Nov. 27, 2013 and put into effect on Aug. 1, 2014. The GB 18582-2008 and GB/T9780-2013 methods were both published by General Administration of Quality Supervision, Inspection and Quarantine of the P. R. China and Standardization Administration of the P. R. China.

The aqueous coating composition of the present invention may be prepared by admixing the aqueous dispersion of the present invention, and optionally a pigment and/or an extender. Components in the aqueous coating composition may be mixed in any order to provide the aqueous coating composition of the present invention. Any of the above-mentioned optional components may also be added to the composition during or prior to the mixing to form the aqueous coating composition. The pigments and/or extenders are preferably mixed with the dispersant to form a slurry of pigments and/or extender.

The aqueous coating composition of the present invention can be applied to, and adhered to, various substrates. Examples of suitable substrates include wood, metals, plastics, foams, stones, elastomeric substrates, glass, wall paper, fabrics, medium-density fiberboard (MDF), particle board, gypsum board, concrete, or cementious substrates. The aqueous coating composition can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the coating composition can dry, or allow to dry, to form a film (this is, coating) at room temperature (20-25° C.), or at an elevated temperature, for example, from 35° C. to 60° C. The coating composition can be used alone, or in combination with other coatings to form multi-layer coatings.

The aqueous coating composition is suitable for various applications such as marine and protective coatings, automotive coatings, traffic paint, Exterior Insulation and Finish Systems (EIFS), roof mastic, wood coatings, coil coatings, plastic coatings, can coatings, architectural coatings, and civil engineering coatings. The aqueous coating composition is particularly useful for architectural coatings.

EXAMPLES

Some embodiments of the invention will now be described in the following Examples, wherein all parts and percentages are by weight unless otherwise specified.

Lauryl methacrylate 1214 (LMA 1214), available from BASF, is a mixture of lauryl methacrylate, tetradecyl methacrylate, and hexadecyl methacrylate, which is a blend of natural $C_{12}$, $C_{14}$, and $C_{16}$ alcohol methacrylates.

Stearyl methacrylate (SMA) is available from Sinopharm Chemical Reagent Co., Ltd.

Ethyl acrylate (EA) synthesized from bioethanol is available from The Dow Chemical Company.

Methacrylic acid (MAA), acrylic acid (AA), sodium p-styrene sulfonate (SSS), tert-Butyl hydroperoxide (t-BHP), sodium persulfate (SPS), and mono ethanol amine (MEA) are all available from Sinopharm Chemical Reagent Co., Ltd.

Acetoacetoxyethyl methacrylate (AAEM) is available from Eastman.

Styrene (ST) is available from CNOOC & Shell Petrochemicals Co., Ltd.

Butyl acrylate (BA) is available from BASF.

Methyl methacrylate (MMA) is available from The Dow Chemical Company.

DISPONIL FES 32 surfactant (Fes-32), available from BASF, is sodium dodecyl ethoxylated sulfate.

DISPONIL A-19 IS surfactant (A-19) is sodium dodecyl (Linear) benzene sulfonate.

BRUGGOLITE FF6M reducing agent (FF-6), available from Brueggemann Chemical, is sodium salt of an organic sulfinic acid derivative.

Silquest A-171 silane (A-171), available from Momentive Performance Materials Inc., is vinyl trimethoxysilane.

Silquest A-174 silane (A-174), available from Momentive Performance Materials Inc., is 3-(Trimethoxysilyl)propyl methacrylate.

Silquest A-187 silane (A-187), available from Momentive Performance Materials Inc., is gamma-glycidoxypropyltrimethoxysilane.

Coatsil MP-200 silane (MP-200), available from Momentive Performance Materials Inc., is an epoxy silane oligomer.

The following standard analytical equipment and methods are used in the Examples.

Freeze/Thaw (F/T) Stability Evaluation

A test coating composition was prepared and stored at room temperature for 24 hours. Then, the KU viscosity of the test coating composition was measured by a Stormer viscometer according to ASTM D562-10 (2014) and recorded as the initial KU. Containers were filled with 75% volume of the test coating composition. The containers were sealed and placed into a freezer at −6° C. for 16 hours, and then taken out from the freezer to allow to thaw at ambient conditions (about 25° C.) for 8 hours. The above steps complete one F/T cycle. The F/T cycles were continued until the sample coagulated or to a maximum of three cycles. After each cycle, the cycle number was recorded if coagulation or gel had been observed. After the completion of 3 cycles, the sample was shaken manually to observe the appearance by the naked eye. A delta KU was recorded relative to the initial KU. If the delta KU is <10 and no grit or coagulum is observed, the sample is rated as "Pass" indicating good freeze-thaw stability. Otherwise, if the sample coagulates, has grits separated, or the delta KU higher 10, the sample is rated as "Fail" indicating poor freeze-thaw stability.

Brush Clogging Test

A test sample was prepared by mixing 100 grams (g) of a test coating composition and 20 g of water. The resultant mixture was poured into a can. Next, a woolen brush was placed into the can which was then put in an oven at 40° C. for 2 hours. The heated brush was taken out and brushed on a board, and then was placed back into the can which was stored in the oven. The above steps complete one cycle. At every cycle, the cycle number is recorded if brush clogging has been observed. After 5 cycles, the brush was gently washed by hand using water. If the brush is not clogged or hardened and there is no precipitation observed inside the brush, the sample passes the brush clogging test, indicating good anti-clogging performance; otherwise, the sample fails the brush clogging test, indicating poor anti-clogging performance.

Stain Removal Test

Stain removal ability was tested by using the GB/T 9780-2013 method. Test samples were casted on black vinyl scrub charts using a drawdown bar to form wet films (thickness: 120 μm). The films were cured for 7 days at room temperature before stains were applied. Test areas consist of 25 millimeters (mm) wide and 100 mm length of the chart cross section. Within the test area, six types of stains (vinegar, black tea, ink, water soluble black, alcohol soluble black, and Vaseline black) were applied on the films. Liquid stains were applied over gauze to prevent the stain from running off from the test area. Stains stayed on the panel for 2 hours before excess stain was wiped off with dry tissue. The test panel was then placed on a scrub tester under a 1.5 kilogram (kg) weight, with a scrubbing cycle of 37 scrubs per minute. After the test panel was scrubbed for 200 cycles, it was removed from the tester, rinsed under running water, and hung up for drying. Then the cleaned stain area was evaluated by measuring the change of reflection index (X) using the formula below, $$X = \frac{Y_1}{Y_0} \times 100$$

where $Y_1$ is reflection index after the stain removal test and $Y_0$ is reflection index before the stain removal test. $Y_1$ and $Y_0$ were tested by BYK spectro-guide instrument.

Based on the obtained reflection index value X, the stain removal score (Ri) for each stain, on a scale of 1 to 10, can be obtained from the below table,

| R | Vinegar | Black tea | Ink | Water soluble black | Alcohol soluble black | Vaseline black |
|---|---|---|---|---|---|---|
| 10 | $99 < X \le 100$ | $98 < X \le 100$ | $96 < X \le 100$ | $96 < X \le 100$ | $95 < X \le 100$ | $99 < X \le 100$ |
| 9 | $98 < X \le 99$ | $95 < X \le 98$ | $91 < X \le 96$ | $91 < X \le 96$ | $89 < X \le 95$ | $98 < X \le 99$ |
| 8 | $97 < X \le 98$ | $91 < X \le 95$ | $85 < X \le 91$ | $85 < X \le 91$ | $82 < X \le 89$ | $97 < X \le 98$ |
| 7 | $96 < X \le 97$ | $86 < X \le 91$ | $78 < X \le 85$ | $78 < X \le 85$ | $74 < X \le 82$ | $96 < X \le 97$ |
| 6 | $95 < X \le 96$ | $80 < X \le 86$ | $70 < X \le 78$ | $70 < X \le 78$ | $65 < X \le 74$ | $95 < X \le 96$ |
| 5 | $93 < X \le 95$ | $73 < X \le 80$ | $61 < X \le 70$ | $61 < X \le 70$ | $55 < X \le 65$ | $93 < X \le 95$ |

-continued

| R | Vinegar | Black tea | Ink | Water soluble black | Alcohol soluble black | Vaseline black |
|---|---|---|---|---|---|---|
| 4 | 90 < X ≤ 93 | 65 < X ≤ 73 | 51 < X ≤ 61 | 51 < X ≤ 61 | 44 < X ≤ 55 | 90 < X ≤ 93 |
| 3 | 86 < X ≤ 90 | 56 < X ≤ 65 | 40 < X ≤ 51 | 40 < X ≤ 51 | 32 < X ≤ 44 | 86 < X ≤ 90 |
| 2 | 81 < X ≤ 86 | 46 < X ≤ 56 | 28 < X ≤ 40 | 28 < X ≤ 40 | 19 < X ≤ 32 | 81 < X ≤ 86 |
| 1 | X ≤ 81 | X ≤ 46 | X ≤ 28 | X ≤ 28 | X ≤ 19 | X ≤ 81 |

The total stain removal score (R') was then calculated according to the formula below, $$R' = \frac{\sum_{i=1}^{n=6} R_i}{n} \times 10$$

where Ri is the stain removal score for different stains and n is 6. In China, the premium standard of stain removal is at least 60 points according to the GB method. Otherwise, the total stain removal score less than 60 points is not acceptable. The higher the total stain removal score, the better stain resistance.

Calculated Biobased Content

For a polymer comprising structural units of $M_1$, $M_2$, ..., Mi monomers, the biobased content of such polymer was calculated according to the equation below, $$\text{Biobased content} = \frac{\sum_{i=1}^{i} \frac{Ai}{Wi} * RCi}{\sum_{i=1}^{i} \frac{Ai}{Wi} * TCi} * 100$$

where A1, A2, . . . , and Ai represent the dosage of monomers; W1, W2, . . . , and Wi represent the molecular weight of monomers; RC1, RC2, . . . , and RCi represent the renewable carbon number of monomers; and TC1, TC2, . . . , and TCi represent the total carbon number of monomers.

The reference molecular weight, renewable carbon number, and total carbon number of monomers are listed below.

| Monomer | Molecular weight | Number of renewable carbon atoms | Total number of carbon atoms |
|---|---|---|---|
| EA | 100 | 2 | 5 |
| LMA1214* | 254 | 12 | 16 |
| SMA | 338 | 18 | 22 |
| BA | 128 | 0 | 7 |
| MAA | 86 | 0 | 4 |
| AA | 72 | 0 | 3 |
| SSS | 206 | 0 | 8 |
| AAEM | 214 | 0 | 10 |
| ST | 104 | 0 | 8 |
| MMA | 100 | 0 | 5 |

*When calculating the biobased content of a polymer made from LMA1214, the molecular weight, number of renewable carbon atoms and total number of carbon atoms of lauryl methacrylate were used for the calculation.

Measured Biobased Content

The measured biobased content of an emulsion polymer was tested by Beta Analytic, Inc., according to ASTM D6866-16 method B.

Example (Ex) 1 Aqueous Dispersion

A monomer emulsion was prepared by mixing EA (936 g), MMA (559.6 g), LMA 1214 (175 g), MAA (17.69 g), SSS (9.57 g), AAEM (53.89 g), A-19 (18.38 g, 19% active), Fes-32 (53.91 g, 32% active), and deionized (DI) water (494 g).

Next, DI water (657 g) and Fes-32 (2.18 g, 32% active) were charged to a five-liter multi-neck flask fitted with mechanical stirring. The contents of the flask were heated to 87° C. under nitrogen atmosphere. The flask was charged with a solution of sodium carbonate (2.17 g sodium carbonate dissolved in 28 g DI water), 0.02 g $FeSO_4.7H_2O$, a solution of ethylenediaminetetraacetic acid (EDTA) sodium salt (0.05 g EDTA sodium salt dissolved in 7 g DI water), the monomer emulsion (59.8 g), and a solution of APS (1.77 g APS dissolved in 17 g DI water). The remaining monomer emulsion, a solution of SPS (1.77 g SPS dissolved in 57 g DI water) and a solution of sodium bisulfate (2.65 g sodium bisulfate dissolved in 57 g DI water) were added gradually over 120 minutes at 84° C. After complete of the feed, the flask was held at 84° C. for additional 30 minutes. Then the contents of the flask were cooled to 70° C. A solution of t-BHP (3.92 g t-BHP (70% active) dissolved in 70 g water) and a solution of FF-6 (2.76 g FF-6 dissolved in 70 g DI water) were fed into the flask over 40 minutes. The contents of the flask were cooled to room temperature. 14.9 g MEA and a solution of sodium hydroxide (2.47 g sodium hydroxide (40%) dissolved in 43.9 g DI water) were added over 15 minutes, then 7.31 g MP-200 was added to obtain the aqueous dispersion of Ex 1 with a solids content of 48.5% and a particle size of 138 nm.

Ex 2 Aqueous Dispersion

The aqueous dispersion of Ex 2 was prepared according to the same procedure as Ex 1 binder above, except that the monomer emulsion used herein was prepared by mixing EA (936 g), MMA (559.6 g), LMA 1214 (175 g), MAA (17.69 g), SSS (9.57 g), AAEM (53.89 g), A-19 (18.38 g, 19% active), Fes-32 (53.91 g, 32% active), and DI water (494 g).

Ex 3 Aqueous Dispersion

The aqueous dispersion of Ex 3 was prepared according to the same procedure as Ex 1 described above, except that A-187 (7.31 g) was added to replace MP-200.

Ex 4 Aqueous Dispersion

The aqueous dispersion of Ex 4 was prepared according to the same procedure as Ex 1 described above, except that the monomer emulsion used was different and MP-200 was not added in Ex 4. The monomer emulsion used in Ex 4 was prepared by mixing 928.7 g of EA, MMA (559.6 g), LMA 1214 (175 g), MAA (17.69 g), SSS (9.57 g), AAEM (53.89 g), A-174 (7.31 g), A-19 (18.38 g, 19% active), Fes-32 (53.91 g, 32% active), and DI water (494 g).

Comparative (Comp) Ex A Comp Aqueous Dispersion

The aqueous dispersion of Comp Ex A was prepared according to the same procedure as Ex 1 described above, except that the monomer emulsion used herein was prepared by mixing EA (1182 g), MMA (489.9 g), MAA (17.69 g), SSS (9.57 g), AAEM (53.89 g), A-19 (18.38 g, 19% active), Fes-32 (53.91 g, 32% active), and DI water (494 g).

Comp Ex B Comp Aqueous Dispersion

The aqueous dispersion of Comp Ex B was prepared according to the same procedure as Ex 1 described above, except that the monomer emulsion used herein was prepared by mixing EA (1049 g), MMA (533.6 g), LMA 1214 (87.45 g), MAA (17.69 g), SSS (9.57 g), AAEM (53.89 g), A-19 (18.38 g, 19% active), Fes-32 (53.91 g, 32% active), and DI water (494 g).

Comp Ex C Comp Aqueous Dispersion

The aqueous dispersion of Comp Ex C was prepared according to the same procedure as Ex 1 described above, except that the monomer emulsion used herein was prepared by mixing EA (963 g), MMA (586 g), LMA 1214 (175 g), MAA (17.69 g), SSS (9.57 g), A-19 (18.38 g, 19% active), Fes-32 (53.91 g, 32% active), and DI water (494 g).

Comp Ex D Comp Aqueous Dispersion

The aqueous dispersion of Comp Ex D was prepared according to the same procedure as Ex 1 described above, except that the monomer emulsion used was different and the addition of MP-200 epoxy silane oligomer was omitted in Comp Ex D. The monomer emulsion used in Comp Ex D was prepared by mixing EA (928.7 g), MMA (559.6 g), LMA 1214 (175 g), MAA (17.69 g), SSS (9.57 g), AAEM (53.89 g), A-171 (7.31 g), A-19 (18.38 g, 19% active), Fes-32 (53.91 g, 32% active), and DI water (494 g).

Comp Ex E Comp Aqueous Dispersion

The aqueous dispersion of Comp Ex E was prepared according to the same procedure as Ex 1 described above, except that the monomer emulsion used was prepared based on the same monomer composition as used in the preparation of a monomer mixture pre-emulsion in step (1) of Example 1 of CN102516436A. The monomer emulsion used in Comp Ex E was prepared by mixing of ST (558.4 g), BA (558.97 g), MMA (260.82 g), SMA (259.78 g), AA (46.02 g), AAEM (68.3 g), A-19 (18.38 g, 19% active), Fes-32 (53.91 g, 32% active), and DI water (494 g).

Comp Ex F Comp Aqueous Dispersion

The aqueous dispersion of Comp Ex F was prepared according to the same procedure as Ex 1 described above, except that LMA 1214 was replaced by the same amount of SMA.

Properties of the above obtained aqueous dispersions are given in Table 1. As shown in Table 1, Comp Ex E dispersion had a much lower biobased content than Exs 1-4 dispersions.

TABLE 1

Compositions and properties of aqueous dispersions

| Composition[1], wt % | Ex 1 | Ex 2 | Ex 3 | Ex 4 | Comp Ex A | Comp Ex B | Comp Ex C | Comp Ex D | Comp Ex E | Comp Ex F |
|---|---|---|---|---|---|---|---|---|---|---|
| EA | 53.5 | 39.5 | 53.5 | 53.1 | 67.5 | 60 | 55 | 53.5 | | 53.1 |
| LMA 1214 | 10 | 20 | 10 | 10 | 0 | 5 | 10 | 10 | | |
| SMA | | | | | | | | | 15 | 10 |
| BA | | | | | | | | | 32 | |
| MAA | 1 | 1 | 1 | 1 | 1 | 1 | 1 | 1 | | 1 |
| AA | | | | | | | | | 2.5 | |
| SSS | 0.5 | 0.5 | 0.5 | 0.5 | 0.5 | 0.5 | 0.5 | 0.5 | | 0.5 |
| AAEM | 3 | 3 | 3 | 3 | 3 | 3 | 0 | 3 | 3.5 | 3 |
| ST | | | | | | | | | 32 | |
| MMA | 32 | 36 | 30.5 | 30.1 | 28 | 30.5 | 33.5 | 30.1 | 15 | 32 |
| A-171 | | | | | | | | 0.4 | | |
| A-174 | | | | 0.4 | | | | | | |
| A-187 | | | 0.4 | | | | | | | |
| MP-200 | 0.4 | 0.4 | | | 0.4 | 0.4 | 0.4 | | | 0.4 |
| Properties | | | | | | | | | | |
| Particle size, nm | 138 | 130 | 143 | 141 | 151 | 140 | 143 | 146 | 148 | 150 |
| Solid, % | 48.52 | 49.9 | 50 | 50.2 | 50.18 | 49.04 | 50 | 50 | 50 | 50 |
| Cal. Fox Tg[2], °C. | 6.5 | 6.2 | 6.5 | 6.5 | 6.9 | 7.2 | 7.4 | 6.5 | 5.1 | 6.5 |
| Cal. BCC[3], % | 30.2 | 33.3 | 30.2 | 29.9 | 26.9 | 28.4 | 30.7 | 29.9 | 12.9 | 31.1 |
| Measured BCC, % | 29.7 | | | | | 27.8 | | | | |
| Process coagulum[4] (ppm) | <200 | <200 | <200 | <200 | <200 | <200 | <200 | <200 | 7708 | 2000 |

[1] by weight based on the weight of the obtained emulsion polymer,
[2] Tg was calculated by the Fox equation,
[3] Cal. BCC (calculated biobased content) for LMA 1214 was about 75%,
[4] process coagulum was determined by filtering an aqueous dispersion through a 100 mesh filter.

Coating Compositions

The as prepared aqueous dispersions (Exs 1 to 4 and Comp Exs A to F) were used as binders for preparing coating compositions, Paints 1-4 and Comp Paints A-F, based on formulations given in Table 2. Ingredients in the grind stage were mixed using a high speed Cowles disperser at a speed of 1,000 revolutions per minute (rpm). Then ingredients in the letdown stage were added and mixed by a conventional agitator at a speed of 500 rpm. Properties of the resultant coating compositions were evaluated according to the test methods described above and results are given in Table 3.

TABLE 2

Coating Compositions

| Raw material | Function | Supplier | Paint 1, gram |
|---|---|---|---|
| Grind | | | |
| Water | | | 200.00 |
| Natrosol 250 HBR | Thickener | Ashland Specialty Chemical Company | 2.00 |
| AMP-95 | Neutralizer | Angus Company | 1.00 |
| Nopco NXZ | Defoamer | San Nopco Ltd. | 1.00 |
| OROTAN ™ 1288 dispersant | Dispersant | The Dow Chemical Company | 6.00 |
| TERGITOL 15-S-40 | Wetting agent | The Dow Chemical Company | 2.00 |
| TI-PUTE R-706 titanium dioxide | Pigment | The Chemours Company | 200.00 |
| DB-80 calcined clay | Extender | Guangfu Building Materials Group | 100.00 |
| CC-700 calcium carbonate | Extender | Guangfu Building Materials Group | 60.00 |
| LetDown | | | |
| Binder as prepared | | | 320.00 |
| ROPAQUE ™ Ultra E polymer | Opaque polymer | The Dow Chemical Company | 40.00 |
| Texanol | Coalescent | Eastman | 8.60 |
| Strodex FT-68 | Anti-freezing agent | Ashland Specialty Chemical Company | 4 |
| Nopco NXZ defoamer | defoamer | San Nopco Ltd. | 1.00 |
| ACRYSOL ™ TT-935 thickener | thickener | The Dow Chemical Company | 0.00 |
| AMP-95 neutralizer | neutralizer | Angus Company | 0.00 |
| Water | | | 52.40 |
| Total | | | 1000.000 |

*OROTAN and ACRYSOL are both trademarks of The Dow Chemical Company.

As shown in Table 3, coating compositions comprising the inventive aqueous dispersion as binders with a biobased content of at least 22% showed both good F/T stability and anti-clogging resistance, while still providing paints made therefrom with good stain resistance (stain removal score of 60 or more). All inventive aqueous dispersion all had a biobased content greater than 25%.

In contrast, the coating composition comprising Comp Ex A dispersion failed the F/T test and provided paints with poor stain resistance. The coating composition comprising Comp Ex B binder failed the F/T test. The coating compositions comprising Comp Exs C and D dispersions both provided coatings with poor stain resistance. Comp Ex E dispersion was prepared from emulsion polymerization of the same monomer composition as those described in Example 1 of CN102516436A. The emulsion polymerization in forming the dispersion of Comp Ex E produced large coagulum particles, showing unacceptable high level of coagulum (more than 7,000 ppm). The paint comprising Comp Ex E dispersion also failed the F/T test. Comp Ex F dispersion also had a large amount of coagulum (about 2,000 ppm) and provided paints comprising thereof with poor stain resistance.

TABLE 3

Properties of Coating Compositions and Coatings

| Coating compositions | Binder in coating composition | Brush clogging resistance | F/T stability | Total stain removal score |
|---|---|---|---|---|
| Paint 1 | Ex 1 dispersion | 1 | Pass | 62 |
| Paint 2 | Ex 2 dispersion | 1 | Pass | 64 |
| Paint 3 | Ex 3 dispersion | 1 | Pass | 62 |
| Paint 4 | Ex 4 dispersion | 1 | Pass | 60 |
| Comp Paint A | Comp Ex A dispersion | 1 | Fail | 57 |
| Comp Paint B | Comp Ex B dispersion | 1 | Fail | 60 |
| Comp Paint C | Comp Ex C dispersion | 1 | Pass | 58 |
| Comp Paint D | Comp Ex D dispersion | 1 | Pass | 58 |
| Comp Paint E | Comp Ex E dispersion | 1 | Fail | 68 |
| Comp Paint F | Comp Ex F dispersion | 1 | Pass | 57 |

What is claimed is:

1. An aqueous dispersion, comprising, by weight based on the weight of the emulsion polymer, from 39.5 to 53.5% of structural units of a soft alkyl (meth)acrylate with a biobased content more than 30% to 60%, wherein the soft alkyl (meth)acrylate is ethyl acrylate;

from 10% to 20% of structural units of a $C_{12}$-$C_{16}$-alkyl (meth)acrylate with a biobased content greater than 60%, wherein the $C_{12}$-$C_{16}$-alkyl (meth)acrylate comprises 62-78% of lauryl methacrylate, 22-38% of tetradecyl methacrylate, and 0 to 10% of hexadecyl methacrylate;

from 1.5% to 2% of structural units of ethylenically unsaturated monomer carrying at least one functional group, wherein the ethylenically unsaturated monomer carrying at least one functional group is selected from methacrylic acid, sodium styrene sulfonate, or a mixture thereof;

from 2% to 6% of structural units of acetoacetoxy alkyl methacrylate which is acetoacetoxy ethyl methacrylate;

from 29% to 36% of structural units of hard monomer which is methyl methacrylate;

from zero to 0.4% of structural units of (meth)acryl functional silane which is 3-(trimethoxysilyl)propyl methacrylate, or γ-glycidoxypropyltrimethoxysilane or mixtures thereof;

from 0.2% to 0.8% of an epoxy functional silane, by weight based on the weight of emulsion polymer;

wherein the epoxy functional silane and structural units of (meth)acryl functional silane is present in a combined amount of from 0.2% to 1%, by weight based on the weight of the emulsion polymer; and wherein total stain removal score is at least 60 using the GB/T 9780-2013 method.

2. The aqueous dispersion of claim 1, wherein the epoxy functional silane is an epoxy oligomer, an epoxy silane compound, or a mixture thereof.

3. The aqueous dispersion of claim 2, wherein the epoxy oligomer has the structure of formula (I),

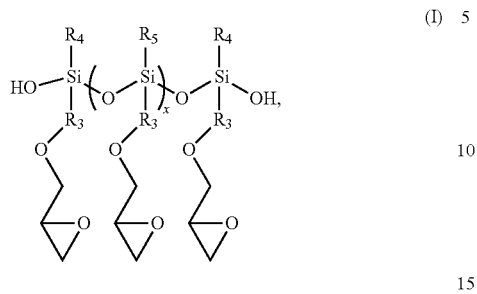
(I)

wherein x is from 0 to 14, $R_3$ is —$CH_2CH_2CH_2$—, and $R_4$ and $R_5$ each independently represent —OH, —$OCH_3$, —$OCH_2CH_3$, or —$CH_3$.

4. The aqueous dispersion of claim 2, wherein the epoxy silane compound is selected from the group consisting of 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, or mixtures thereof.

5. The aqueous dispersion of claim 1, wherein the emulsion polymer has a glass transition temperature of from −20 to 30° C.

6. An aqueous coating composition, comprising, aqueous dispersion of claim 1.

7. The aqueous dispersion of claim 1 wherein the amount of the structural units of the hard monomer is from 30 to 36% based on the weight of the emulsion polymer.

* * * * *